Nov. 10, 1953
A. POLIANSKY
2,659,021
BRAKE AND CLUTCH DEVICE
Filed Sept. 29, 1949
8 Sheets-Sheet 1
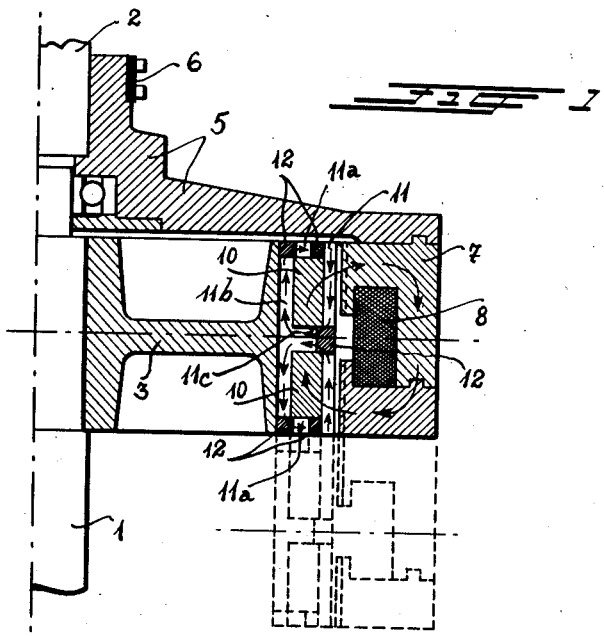
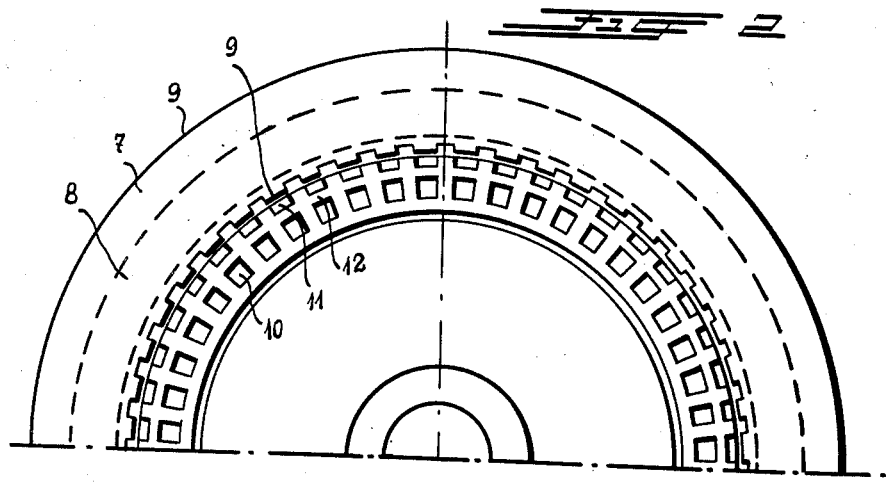

Nov. 10, 1953  A. POLIANSKY  2,659,021
BRAKE AND CLUTCH DEVICE
Filed Sept. 29, 1949  8 Sheets-Sheet 2
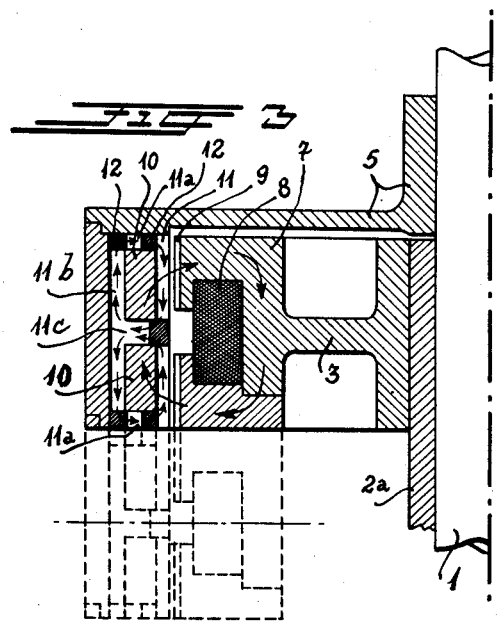
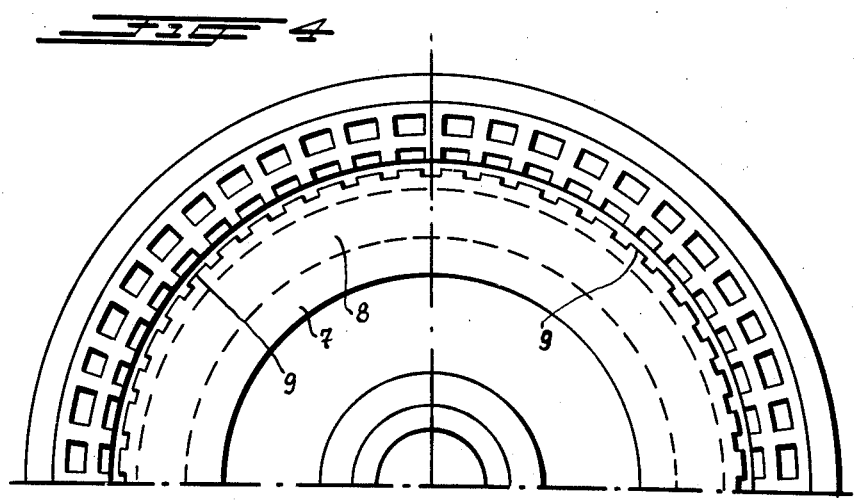

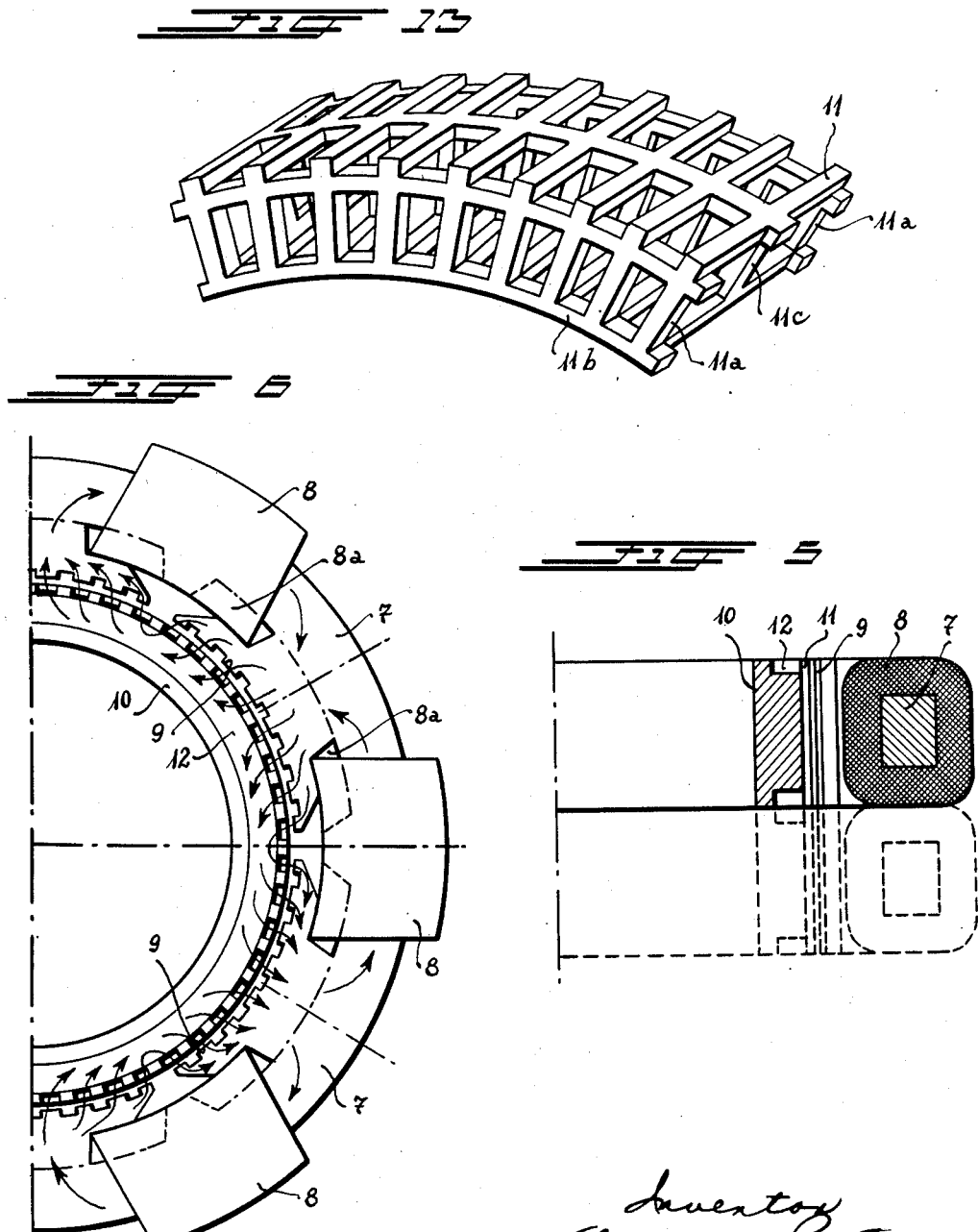

Nov. 10, 1953  A. POLIANSKY  2,659,021
BRAKE AND CLUTCH DEVICE
Filed Sept. 29, 1949  8 Sheets-Sheet 4
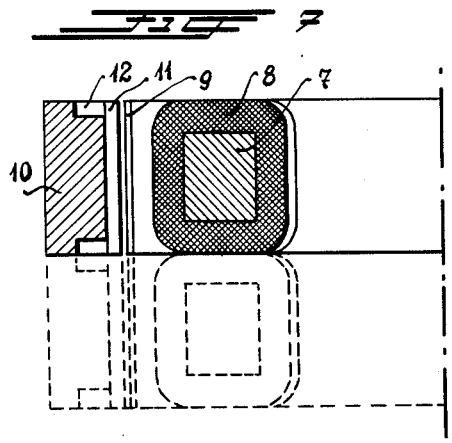
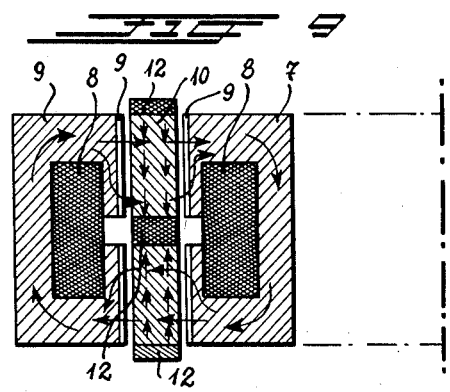
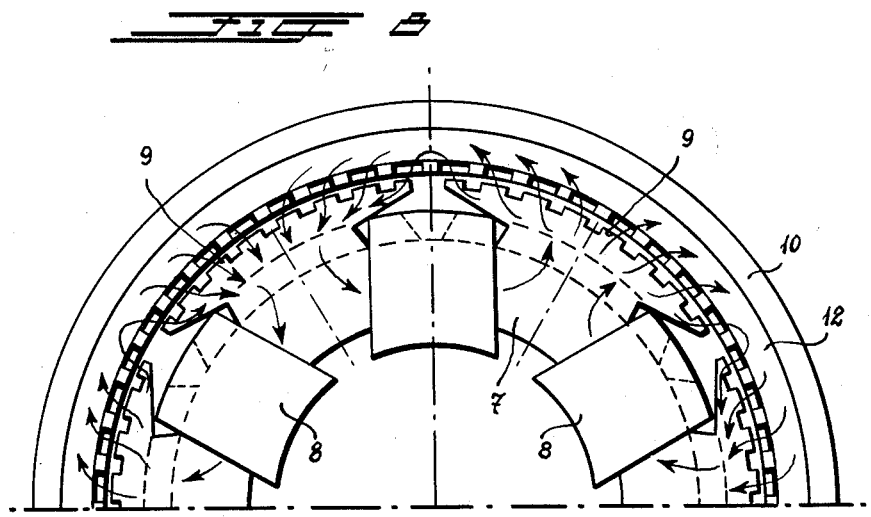
Inventor
Alejandro Poliansky
By

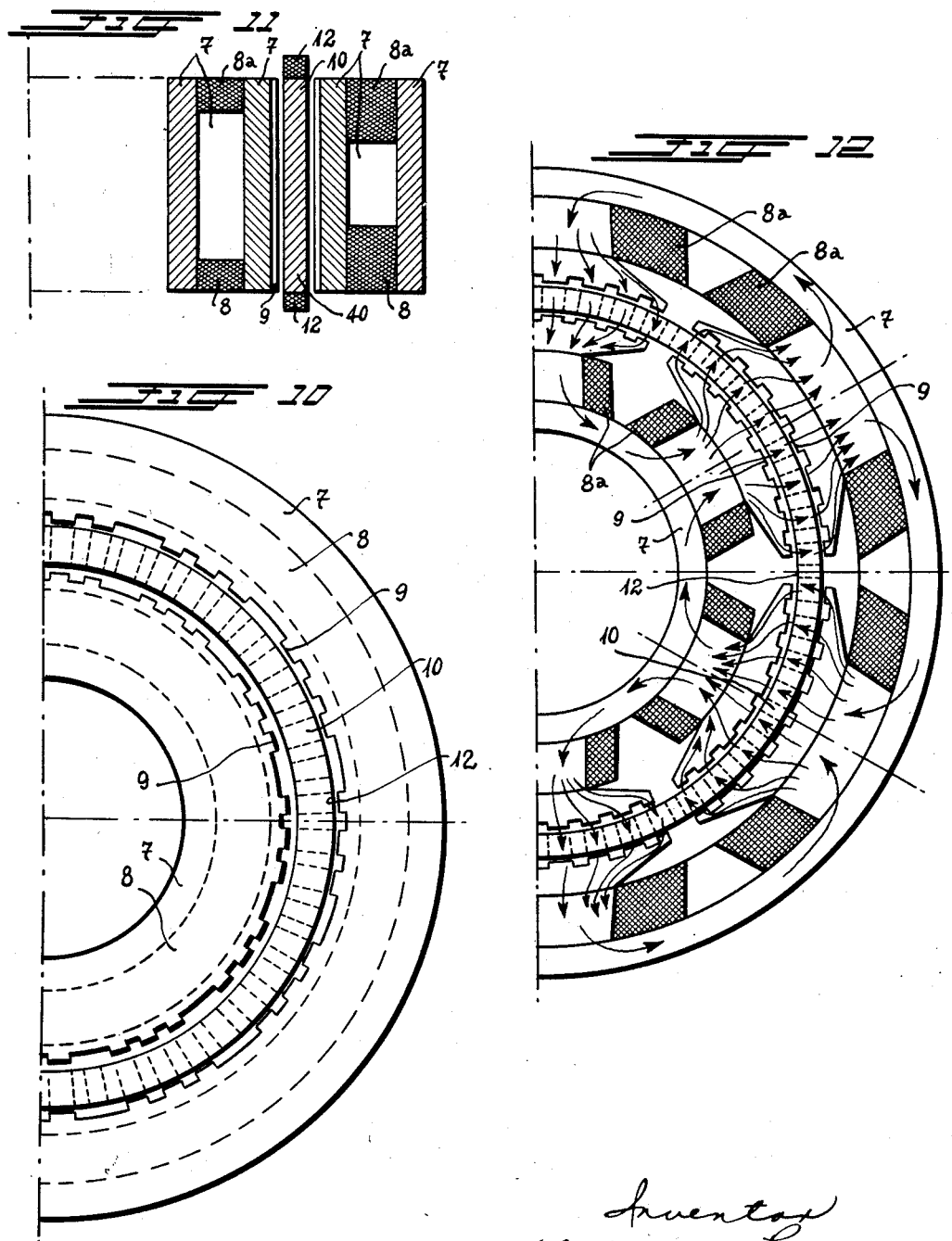

Nov. 10, 1953     A. POLIANSKY     2,659,021
BRAKE AND CLUTCH DEVICE
Filed Sept. 29, 1949     8 Sheets-Sheet 6
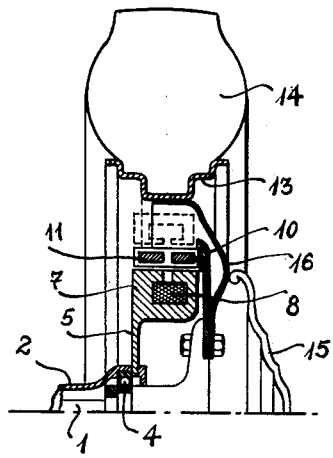
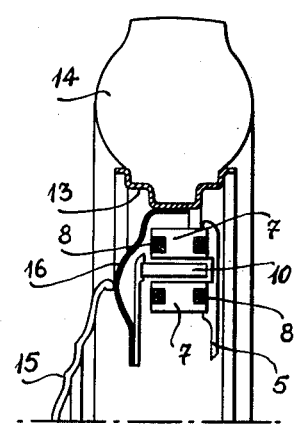
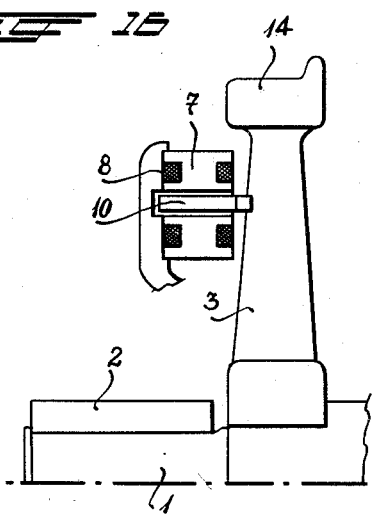

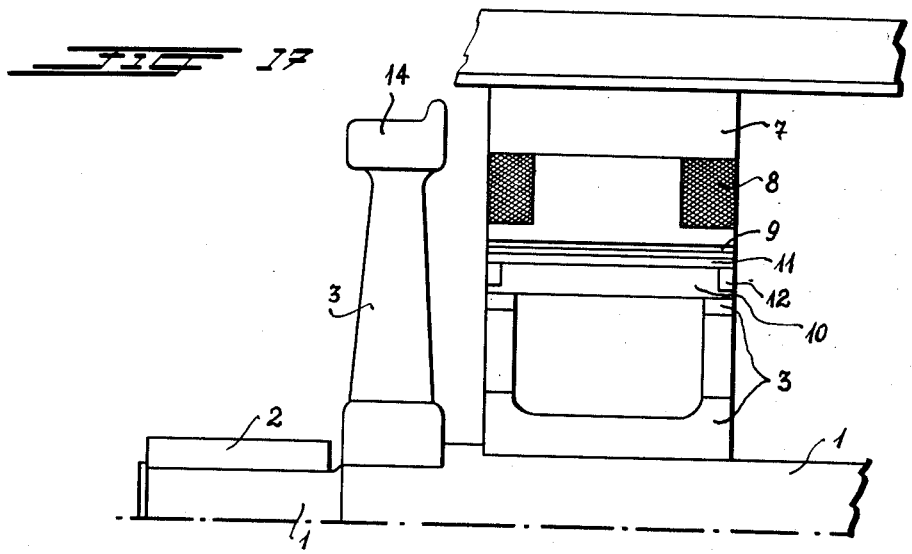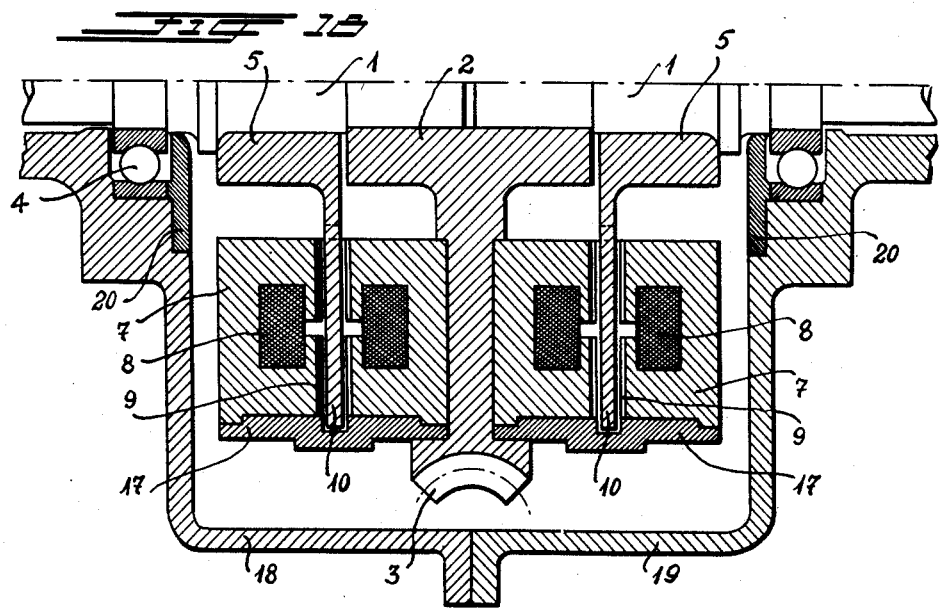

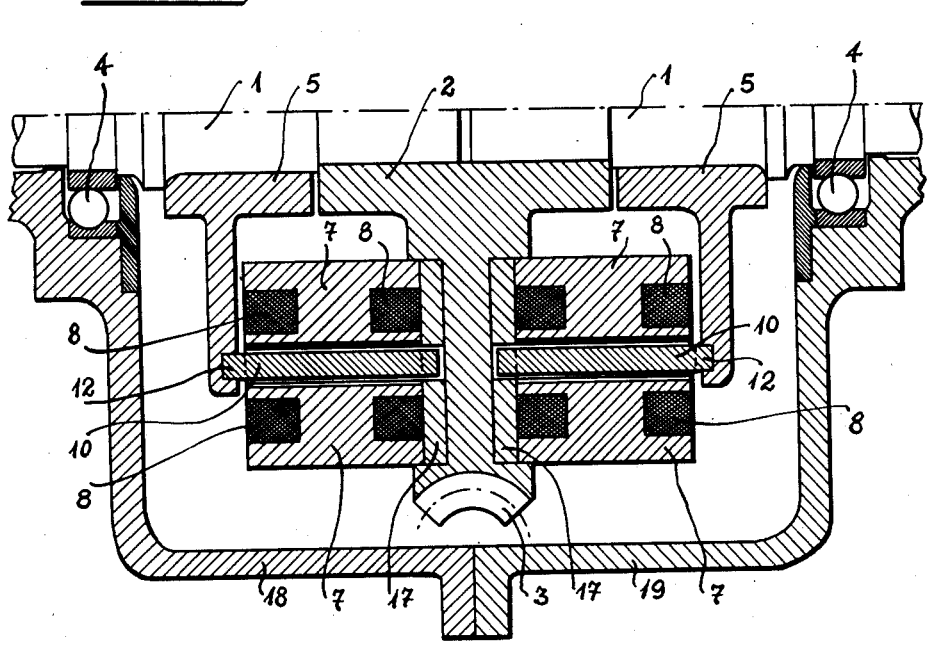

Patented Nov. 10, 1953

2,659,021

UNITED STATES PATENT OFFICE 2,659,021

BRAKE AND CLUTCH DEVICE

Alejandro Poliansky, Buenos Aires, Argentina

Application September 29, 1949, Serial No. 118,580

4 Claims. (Cl. 310—106)

1

My present invention refers to a novel brake and clutch device and more particularly to a device capable of being applied at random as a brake or as a clutch to all kinds of vehicles and machineries wherein rotating movements are to be braked or to be transmitted, respectively.

The main object of my invention is to provide a brake and clutch device which is exclusively operated by the forces of electrodynamic and electromagnetic induction while eliminating all surfaces of mechanical friction between the cooperating operative elements thereof.

Another object of this invention is to provide a brake and clutch device, comprising magnet means and armature means arranged concentrically and co-axially to one another.

Another object of this invention is to provide a brake and clutch device, as set forth, wherein an annular field member is arranged externally or internally with reference to an annular armature.

A further object of my invention is to provide a brake and clutch device, comprising concentrically and co-axially arranged magnet means and armature means and having said magnet means formed by two concentrical annular field members and said armature means arranged between said two annular field members.

Still another object of my invention is to provide a brake and clutch device, comprising concentrically and co-axially arranged magnet means and armature means, said magnet means having a composite annular structure composed of a number of electromagnetic coils.

Still another object of my invention is to provide a brake and clutch device, comprising concentrically and co-axially arranged magnet means and armature means, said magnet means having two composite annular structures each composed of a number of electromagnetic coils and said armature means being arranged between said two magnet structures.

Another important object of my invention is to provide a brake and clutch device, comprising concentrically and co-axially arranged magnet means and armature means and having said magnet means provided with permanent magnets.

An additional object of this invention is to provide a brake and clutch device, comprising at least two co-axially arranged electrodynamic brake or clutch units as set forth in the preceding paragraphs, and means for physically interconnecting said units one aside the other.

An additional object of this invention is to provide a brake and clutch device, comprising at

2 least two concentrically arranged electrodynamic brake or clutch units as set forth in the preceding paragraphs, and means for physically interconnecting said units one upon the other.

A further important object of my invention is to provide a brake and clutch device, comprising concentric and/or co-axial magnet means and armature means and having said magnet means provided with a number of cogs extending into the annular gap formed between said magnet means and armature means for concentrating the magnetic field lines.

According to one feature of my invention, the brake and clutch device as referred to in the preceding paragraphs comprises at least two main concentric and/or co-axial parts—a field member and an armature—physically separated from one another by an annular gap or air cushion, but dependent one upon the other, in their operation, by virtue of an adjustable magnetic field generated by said field member when direct current is caused to pass therethrough and to induce electromotive force in the windings of said armature as long as field member and armature are rotating at different speed, so that an electric current is produced in the armature windings, whereas Foucault currents and the phenomenon of hysteresis are produced in the ferromagnetic core of the armature, and the armature is caused to follow the movements of the field member due to the electrodynamic reaction between the magnetic field and the induced electric currents and also due to hysteresis.

According to another advantageous feature of my invention, the electrodynamic brake and clutch device constitutes, on the one hand, a brake of solid and simple construction, of absolutely reliable operation, and of an easily adjustable braking capacity which, when applied at a maximum rate, has a vigorous effect, and which is practically inexhaustible, without necessity for readjustment, and rendering a blocking of the braked parts during the braking operation impossible, said device constituting, on the other hand, a clutch which is particularly advantageous as far as variable speed, adjustable starting and simple construction without any frictional parts are concerned, and which is furthermore advantageous insofar as axial push is absolutely eliminated and liquid-tight seals such as are required in hydraulic brakes are rendered superfluous.

A further important feature of this invention is to avoid a concentration of heat occurring in the presently used brakes and clutches in those surface parts that are subject to mechanical friction and wear, requiring therefore readjustment or even replacement of worn-off parts. Each vehicle in motion or rotating shaft fitted with wheels or disks possesses kinetic energy which is converted into thermic energy when said vehicle or shaft are slowed down by braking. Heat is produced due to the effects between friction surfaces as well as by the electric currents induced in the magnetic field in the electrodynamic brake according to this invention. But while the friction surfaces in the presently used brakes and clutches are worn off and require readjustment or replacement of parts, in which the heat is concentrated, the heat generated in electrodynamic brakes and clutches according to this invention is uniformly distributed over the whole body of the armature, and, since the brakes and clutches are built of metal, they will sustain high temperatures without losing their braking capacity, while there are no parts subject to mechanical friction that might wear off and no repairs or replacements are therefore necessary. The following example may demonstrate more clearly the advantages offered by the even distribution of heat over the whole device:

A vehicle having a weight of 2,000 kg. shall be moving at a speed of 100 km. per hour, and shall be braked until coming to a standstill by the effect of four electrodynamic brakes, whose armatures weigh 8 kg. each. The kinetic energy of the vehicle is equal to $$\frac{m \cdot v^2}{2} \text{ kg.} \cdot \text{m.}$$

In this equation $$m = \frac{2000}{g} = \frac{2000}{9.81} = 203.9 \text{ kg.} \cdot \text{sec.}^2/\text{m.}$$

and $$v = \frac{100 \cdot 1000}{3600} = 27.8 \text{ m./sec.}$$

and therefore $$\frac{m \cdot v^2}{2} = \frac{203.9 \cdot 27.8^2}{2} = 78800 \text{ kg.} \cdot \text{m.}$$

This kinetic energy must be converted into thermic energy which amounts to $$\frac{78800}{427} = 185 \text{ kcal.}$$

Supposing the armatures of the brakes are made of iron and the windings of copper, their average specific heat will be approximately 0.11 cal.·kg./centigrade, and the thermic capacity of the four brakes will amount to $$4 \cdot 8 \cdot 0.11 = 3.52 \text{ cal./centigrade}$$

equivalent to 185:3.52=52.5 centigrades, which means an insignificant increase of temperature that will in no way affect the iron armature or the copper windings even at a temperature being five or six times higher, which would, indeed, very seriously affect the material of friction brakes if used in such braking operation.

Another no less important feature of this invention is to insure an effective braking of, for instance, the wheels of an automobile without causing said wheels to be blocked, as it would occur easily when brakes operated by mechanical friction are applied vigorously at high speed, thus causing the dreaded skidding effect. An electrodynamic brake according to this invention, however, will make a blocking of the wheels impossible for the simple reason that, if the wheels would come to a halt, there would be no further induction of electric currents, which induction is the indispensable factor in bringing about the braking effect, the more so as the effect of any permanent magnets present in the device is by itself wholly insufficient for arresting the wheels of a vehicle in motion; on the contrary the wheels must still be in rotation in order to produce the braking effect provided for by this electrodynamic device. The advantages obtained through this invention are of particular value in rainy or foggy weather, or on moist or icy rail or road surfaces, since it is well known that in order to achieve the best possible braking effect the wheels, for instance of an automobile or other vehicle, must not be blocked, so that the coefficient of adhesion between the tires and the road surface always exceeds the coefficient of friction between the same elements. For instance, the wheels of a railway truck rolling upon a dry and clean line of rails will have a coefficient of adhesion of approximately 220 to 300%, while their coefficient of friction will be approximately 170% at relatively low speed, the latter coefficient diminishing at higher speed and amounting to approximately 40% only at a speed of 80 km. per hour. For this reason a vehicle will be brought to a halt more rapidly if the wheels, when braked, are not blocked, a further advantage of avoiding immobilisation of the wheels being less abrasion of the wheel rims, in particular the automobile tires, which are worn off strongly through skidding. It is known that the wheels of a train, automobile, or other vehicle will be blocked by abrupt braking dependent upon the force which is applied by the braking shoes to the rims or braking disks as well as upon the conditions of the rail or road surface, the coefficients of adhesion and friction depending considerably upon the weather and the resulting conditions of the rail or road surface.

In accordance with another advantageous feature of this invention, the electrodynamic brake device will permit easy regulation of the braking force applied to the braked parts, through simply changing the intensity of the electric current that produces the electrodynamic forces operating the brake device according to this invention, by means of altering the resistance of a rheostat or variable resistance coil or the like, which may preferably be connected in series with the coil or coils of the field member of said brake device. For the same purpose several braking units may be jointly arranged on the same shaft or axle, in which case the coils of the field members of each unit may be connected in series, in parallel, or in parallel series, depending upon the voltage of the source of current. The source of direct current that feeds the field members shall preferably be independent of the shafts or axles that are to be arrested by the braking operation, for in case said shaft or axle is forming simultaneously the rotating part of the generator of electric current, the fact that it is slowed down during the braking operation will also cause a decrease in the voltage of the current generated, thus weakening at the same time the magnetic field of the field member, and the vigor of the braking operation, thereby delaying the stopping of the vehicle accordingly.

The vehicle or the like in motion will come to a halt more rapidly if the source of current is not combined with said shaft or axle, and if, consequently, its voltage does not vary during the braking operation. It is therefore provided by this invention that the source of electric current which is to be used for braking automobiles or the like by means of an electrodynamic brake, shall consist of the battery which forms part of the outfit of each automobile, truck, airplane, or train. If such electrodynamic brakes are to be applied in other instances, for example with a stationary engine and the like, a battery, an accumulator, a direct-current generator, a rotating or a static rectifier may be used as a separate source of direct current.

Since an electrodynamic brake only requires a rheostat or variable resistance and connecting lines in order to regulate the braking effect, the design of said device can be much simpler than that of presently used brakes, which have either a complicated mechanism of levers, axles, springs and the like, or have to be fitted with complete aggregates of compressed-air or vacuum containers, oil drums etc. in addition to the already mentioned levers, axles and the like.

When applying the electrodynamic device according to this invention as a clutch, regulation of the driving power of the driving pin of the clutch is just as easily achieved as that of the braking operation when using the device as a brake, i. e. by simply changing the current intensity by means of a rheostat or variable resistance connected in series with the coil or coils of the field member. Although the hydraulic variable-speed clutch has many advantages over the friction clutch, it shows nevertheless such inconveniences as, for instance, a complicated design, difficulties of regulating the liquid pressure at varying speed due to the changes in viscosity of the liquid with temperature, and finally the necessity for hermetic sealing of all parts in order to prevent leakage, and furthermore an inconvenience that is common to all clutches, i. e. axial push, which disadvantages are all overcome by the electrodynamic clutch according to this invention. In accordance with this invention the electrodynamic clutch may also comprise several units of clutches mounted jointly on one and the same axle or shaft.

One further feature of this invention is to secure a more perfect synchronisation in an electrodynamic clutch device according to this invention by designing the grooves between adjacent cogs of the field member in such a way in relation to the windings of the armature that, after the start has been achieved, the two elements of the clutch are being synchronized by the effect of attraction of the magnets.

According to yet another feature of this invention, consumption of the electric current required to excite the field member, is rendered unnecessary, once the two clutch elements have been synchronized, by providing on the same axle or shaft a supplementary rigid clutch or the like, which will become operative by means of an electromagnet or other device, and will then replace the electrodynamic clutch, so that the supply of electric current to the field member of the latter may be interrupted, after synchronisation of the clutch elements has been achieved.

According to one further feature of this invention the inductor may have permanent magnets, in which case no current would be required for excitation and, consequently, the aforementioned supplementary clutch would become superfluous.

With these objects and advantageous features in view the present invention comprises the arrangement, combination and construction of parts as will be hereinafter fully described with particular reference to the accompanying drawings, wherein:

Fig. 1 is a fragmentary sectional view showing one half of an electrodynamic clutch having a single coil field member which is arranged externally with regard to the armature, the dotted lines indicating a second clutch unit arranged in parallel on the same axle or shaft;

Fig. 2 is a side view of the device as shown in Fig. 1;

Fig. 3 is a fragmentary sectional view showing the same electrodynamic clutch as in Fig. 1 but having the field member arranged internally with reference to the armature;

Fig. 4 is a corresponding side view of Fig. 3;

Figs. 5 and 6 are views analogous to Figs. 1 and 2, respectively, showing an electrodynamic brake and clutch device having a field member which comprises a plurality of coils and an armature having a cage winding and collector rings embedded in said armature, said field member being arranged externally with regard to said armature in this particular embodiment;

Figs. 7 and 8 are views analogous to Figs. 5 and 6, respectively, illustrating the same electrodynamic device, but having the field member arranged internally with reference to the armature;

Figs. 9 and 10 are views analogous to Figs. 7 and 8, respectively, showing an electrodynamic brake and clutch device, having a twin field member which comprises two coils, and an armature being arranged between the two coils of said twin field member;

Figs. 11 and 12 are analogous views of Figs. 9 and 10, respectively, representing an alternative embodiment of the electrodynamic brake and clutch device, having a twin field member with a plurality of coils, the armature being arranged between the coils of said twin field member;

Fig. 13 is a fragmentary perspective view of the armature as used in any of the embodiments shown in Figs. 1 to 12;

Fig. 14 is a fragmentary sectional view of an automobile wheel showing an electrodynamic brake having a field member with a single coil incorporated therein, while the dotted lines indicate a field member having a single coil and arranged externally with reference to the armature in accordance with Figs. 9 and 10;

Fig. 15 is a view similar to Fig. 14 wherein an electrodynamic brake is provided with a twin field member having a plurality of coils;

Fig. 16 is a fragmentary sectional view of the wheel of a railroad wagon provided with an electrodynamic brake having a twin field member with a plurality of coils incorporated therein;

Fig. 17 is a fragmentary schematic view, showing the application of an electrodynamic brake to the axle of a railroad wagon between the wheels of the latter;

Fig. 18 is a fragmentary sectional view of an automobile differential containing two electrodynamic clutches having a twin field member with two coils, and Fig. 19 is a view similar to Fig. 18 wherein a twin field member comprises a plurality of coils arranged at both sides of an armature.

Referring now to the drawings in detail it will be seen that in Figs. 1 and 2, wherein the electrodynamic device forming the subject of this invention has been embodied as a clutch in simple form, reference numbers 1 and 2 indicate axles or shafts combined by means of the electrodynamic clutch; a wheel 3 which supports the armature of the clutch is mounted on an axle 1; a ball or roller bearing 4 serves to center the two elements of the clutch consisting of a field member and the aforesaid armature; the flanged sleeve 5 supporting the field member of the electrodynamic clutch is fixed on the axle or shaft 2 and is provided with current-feeding rings 6 which are connected in suitable manner (not shown) with the field member coil; the body of the field member 7 which is made of ferromagnetic material having a great magnetic permeability and little or no residual magnetism, is provided with an internal annular cavity or channel to house the coil 8 of the field member, and has a plurality of cogs 9 that are to be converted into magnets, said cogs being so arranged as to be placed opposite the windings of the armature. The body of the armature 10 is also made of ferromagnetic material having a great magnetic permeability and little or no residual magnetism. The armature as such is composed of ferromagnetic bodies 10 and a composite winding 11, 11a, 11b and 11c which is formed by the external active conductors 11 wherein the chief amount of electromotive force is being induced in each half thereof with the same magnitude, but in opposite direction, the external vertical conductors 11a connecting the conductors 11 with the conductors 11c, whereas in the centrally arranged vertical conductors 11b electromotive force is also induced, and the internal conductors 11c serve as return conducts for the electric currents induced in the active conductors (see also Fig. 13). The reference numeral 12 indicates some equilibrator-collector rings.

This electrodynamic brake and clutch device whose construction according to Figs. 1 and 2 of the accompanying drawings has just been described, is based upon the induction of electric currents in metallic bodies, herein called armatures, which are moving in a magnetic field produced by a field member, whereby the following effects are achieved:

(a) An electromotive force proportional to the amount of magnetic flow and to the velocity at which the winding of the armature is cutting the magnetic lines of said flow, is induced in said winding, and an electric current dependent on this electromotive force;

(b) Eddy currents formed in the bodies 10 of the armature, but not in the windings 11 of the latter;

(c) Hysteresis produced by variations in the amount of magnetic induction in the windings of the armature; and (d) The attraction of the magnets (cogs of the inductor exercised upon the bodies 10 of the armature, produced as a final part of the braking or clutching operation.

Due to the processes described under (a), (b), and (c) the armature is heated as a result of the braking and clutching operation.

The basic functioning of the electrodynamic brake and clutch device appears thus to be similar to the working of a dynamo or electromagnetic generator in so far as in both of them an armature is rotating in a magnetic field, its windings passing through the lines of said magnetic field, thereby producing an electromotive force and, consequently, inducing electric currents which must be used, in the case of the dynamo, to drive some kind of motor; in the case of the device being used as a brake these electric currents are used to counteract the kinetic energy of a vehicle in motion which is to be slowed down or halted; and when applying the device as a clutch, they are used in order to transmit the force of the motor from one axle or shaft to another.

The difference between the functions as an electrodynamic brake and clutch device and as a dynamo lies in that in a dynamo energy of various kind is being transformed into electric energy and the latter is led away, for which purpose the dynamo is so constructed as to achieve a minimum of losses caused by electric currents, eddy currents and hysteresis, therefore replacing the massive iron body by thin iron sheets, while in the case of application as an electrodynamic brake, the purpose is to convert kinetic into thermic energy by using the electric currents, eddy currents, and hysteresis. Therefore, the effects which are considered a loss of energy in a dynamo, are considered desirable in an electrodynamic brake or clutch.

The bodies 7 and 10 of the field member and of the armature respectively consist of massive bodies (and not of thin sheets) of a ferromagnetic metal alloy (soft iron, steel, cast iron containing silicon, etc.) having a great magnetic permeability and little or no residual magnetism after the supply of electric current to the inductor has been cut.

The windings and the coils are made from metal of low ohmic resistance, for instance of copper, bronze, aluminum or similar metals or their alloys. If the windings of the armature are to be omitted the latter may well be designed without having windings, especially if the alloy of which the armature is made has little ohmic resistance. The known processes of centrifugal casting or other suitable methods now used in the manufacture of electromotors are conveniently used for the production of armature on larger scale.

When comparing the embodiment of the electrodynamic clutch as described in Figs. 1 and 2, together with the variations as shown in Figs. 3 and 4 it will be noted that the field member 7, 8 may also be internally arranged with regard to the armature 10, 11.

One further variation of the electrodynamic device as shown in Figs. 1 and 2 is demonstrated in Figs. 9 and 10, wherein is shown a twin field member comprising two annular coils 8, between which the armature 10, 11 has been arranged.

The embodiment of the electrodynamic brake or clutch device shown in Figs. 5 and 6 differs from those described above by the fact that the field member comprises a plurality of coils 8. In the embodiment as shown in Figs. 5 and 6 this field member which is arranged externally with regard to the armature, might just as well be arranged internally as is shown in Figs. 7 and 8.

According to the embodiment as shown in Figs. 9 and 10 the electrodynamic brake or clutch device may also be provided with a twin field member having a plurality of coils arranged at both sides of the armature, as is shown in Figs. 11 and 12. The coils 8 of the field member of the electrodynamic devices may be carried out in different ways, two of which are shown in Figs. 6, 8 and 12.

In view of the fact that the electrodynamic brake and clutch device according to this invention operates on the principle that an armature is passing through the lines of a magnetic field or fields formed by a single or twin field member, the details of where the latter is arranged, be it inside or outside or at both sides of the armature, does not influence the braking or driving effect of the device. The selection of one or the other embodiment of the electrodynamic device will depend upon the design, constructional details, and placement of the device to be applied as a brake or clutch.

The coils of the field members will be made in the following way: Neighboring coils will be wound in inverted sense, so that the polarity of the poles of the electromagnets will alternate in a north-south-north-south sequence. (See Figs. 6, 8 and 12.) Therefore the polarity of neighboring electromagnets must be taken into account carefully also when jointly applying various units of a brake-clutch in parallel, so that these are not short-circuited without passing the armature.

The field members of all types of the electrodynamic device according to this invention are provided with cogs 9, and the grooves between the latter are made so deep that practically the whole magnetic field has to emanate from said cogs, which form the magnets that attract the armature. The arrangement of the cogs 9 is made in conformity with the cooperating armature, i. e. in such a way that each cog of the field member is of a width larger than the distance between adjacent cogs and that the grooves or cavities between adjacent cogs is equal the width of the opposite winding of the armature; in this way, the whole magnetic field will pass through the cogs of the field member.

The purpose of providing these cogs 9 is the following: when, for instance, a vehicle or axle is being braked, the rotation velocity of the latter is reduced—while in the case of a clutch the difference of velocities is reduced—and, at a certain instance, the armature will be arrested by the effect of the magnets formed in the cogs of the field member—while in the case of a clutch, the rotation of the inductor and the armature will be synchronised—and it is easy to see that, when we for instance assume that the armature is displaced by 2 millimeters from its position opposite the cogs of the field member, the forces produced by such displacement move both elements back into a directly opposed position, and these forces would increase if the field member should still be in motion, because of the induction effect of the magnetic lines which surround the winding of the armature, when the electric current is passing through it.

As has already been stated, in the case of application of the electrodynamic device as a clutch the electromagnets may be substituted by permanent magnets which must also be provided with cogs 9 so that the rotation may be synchronized. If it is not necessary to achieve synchronization between the elements of the clutches, or if, in the case of a brake, it is not intended to bring a vehicle or axle to a complete standstill through the effect of the magnets, then the use of cogs may be omitted in both cases, which would naturally simplify the construction of the inductor.

The armature may also be subject to certain variations, the principal reasons for such differences consisting in electromagnetic working conditions; thus in electrodynamic devices having field members with one single coil, the body of the armature must serve as a passage for the magnetic lines so that the magnetic lines indicated by long arrows in Figs. 1, 3, 6 and 8 form a closed circuit between adjacent poles of opposite denomination.

It is understood that in the cases of electrodynamic devices having inductors with a single coil, the bodies of the armature and the thickness of the conductors of the windings of said armature have such dimensions as to achieve the best working conditions possible.

In an electrodynamic brake and clutch device having twin field members the magnetic field has to pass through the body of the armature along the shortest line of its flow between the poles of the electromagnets. In this case the windings are conveniently extended over the whole width of the body of the armature, as has been shown in Figs. 9, 10, 11 and 12.

As far as the passage of the electric currents through the windings of the armature is concerned, which is indicated by short arrows in Figs. 1, 3 and 9, it is necessary to provide conductors free from induction, so that the currents are short-circuited. This is achieved in the windings of the armature (Figs. 1 and 3) in the active external conductors 11 in which the electromotive force is being induced, and which are connected with the conductors 11c by means of the vertical conductors 11a and 11b, electromotive forces also being produced in the latter of these conductors.

The conductors 11 and 11a will be conveniently arranged in oblique position with reference to the axle or shaft of the brake and clutch device, in which case the inductor may carry cogs 9 on all those parts of its surface which are opposed to the armature, while, if the conductors 11 and 11a referred to are parallel to the axle, some cogs, for instance every second one, will have to be omitted, in order to provide for short-circuiting of the current, because in this case there will be no dynamic, but static induction of electromotive force. In the armatures of the electrodynamic brake and clutch devices having a twin field member which comprises two annular coils, it is necessary to provide the rings 12 at both sides and in the middle of the body of the armature in order to collect the current, and to omit some of the cogs 9 (every fourth cog in Fig. 10) in order to allow for short-circuiting in the places where the cogs have been omitted. In electrodynamic brake and clutch devices having a field member with several coils, the armature has a cage winding with collector rings which allow to short-circuit the currents, while in electrodynamic devices having a twin field member and a plurality of coils at both sides of the armature, the cage windings are extended over the whole width of the latter, which is also provided with collector rings at both sides.

With regard to the air cushion or gap it is known that, when the magnetic field is formed, the greater part of the ampere-turns of the electromagnets are absorbed by the air, so that the width of the gap between the iron bodies determines the dimensions of the coils of the electromagnets for a given number of magnetic lines per square centimeter of surface of the gap; in other words, for the same electromagnets the effect of braking or clutching will be reciprocal to the square of the width of the gap.

Referring back to Figs. 6 and 8 the parts indicated by reference number 8a represent a different arrangement of the coils of the field member 7.

In Figs. 14 and 15, which show the application of the electrodynamic brake device to an automobile wheel, the component parts of said wheel have been designated by reference numbers 13, 14, 15 and 16.

The brake type of Fig. 14 is that shown in accordance with Figs. 9 and 10, whereas that of Fig. 15 corresponds to the embodiment shown in Figs. 11 and 12.

Figs. 18 and 19 show the application of an electrodynamic clutch to an automobile differential gear wherein reference number 17 indicates the supports of the field members, 18 and 19 the casing of the differential gear, and 20 the cover of the ball bearing.

Without further analysis, the foregoing will so fully reveal the gist of my invention that others can, by applying current knowledge, readily adapt it for various applications without omitting features that, from the standpoint of prior art, fairly constitute essential characteristics of the genetic or specific aspects of this invention and, therefore, such adaptations should and are intended to be comprehended within the meaning and range of equivalence of the following claims.

What I claim as new and desire to secure by Letters Patent is:

1. A brake and clutch device, comprising, in combination, a first shaft; an annular magnet rigidly connected to said first shaft; a second shaft; an annular armature rigidly connected to said second shaft, said armature including a body consisting of ferro-magnetic material and cooperating with said annular magnet so as to define an air gap therewith; a complex low ohmic winding partly embedded in said body of said armature and having a plurality of conductors arranged on the face of said armature facing said gap, said conductors being separated from one another by said ferro-magnetic material of said body; and a plurality of pairs of axially spaced, axially aligned teeth having their leading edges parallel to their trailing edges forming part of said annular magnet and each of said teeth having a face arranged substantially parallel to said face of said armature, each of said faces of said teeth having a width larger than the distance between each two consecutive teeth and substantially equal to the widths of the ferro-magnetic material between said conductors of said winding of said armature whereby when said magnet rotates at different speed from said armature, said teeth induce voltages in said conductors aiding effectively in the synchronization of said armature with said magnet.

2. A brake and clutch device as claimed in claim 1 in which said second shaft is in alignment with said first shaft.

3. A brake and clutch device as claimed in claim 1 and in which said plurality of conductors of said complex low ohmic winding are arranged substantially rectilinear on the face of the armature facing said gap substantially parallel to the axis of the second shaft.

4. A brake and clutch device as claimed in claim 1 and in which said annular armature is arranged concentrically to, and inside said annular magnet.

ALEJANDRO POLIANSKY.

References Cited in the file of this patent

UNITED STATES PATENTS

| Number | Name | Date |
|---|---|---|
| 473,042 | Willians | Apr. 19, 1892 |
| 653,424 | Lunt | July 10, 1900 |
| 1,980,656 | Barnett | Nov. 13, 1934 |
| 2,071,943 | Fraser | Feb. 23, 1937 |
| 2,345,850 | Winther | Apr. 4, 1944 |
| 2,357,509 | Falk | Sept. 5, 1944 |
| 2,392,148 | Hornbostal | Jan. 1, 1946 |
| 2,401,187 | Prince | May 28, 1946 |

FOREIGN PATENTS

| Number | Country | Date |
|---|---|---|
| 912,822 | France | May 13, 1946 |